(12) United States Patent
Nakayama et al.

(10) Patent No.: US 11,318,617 B2
(45) Date of Patent: May 3, 2022

(54) MANIPULATOR AND MOVING ROBOT (71) Applicant: TOYOTA JIDOSHA KABUSHIKI KAISHA, Toyota (JP)

(72) Inventors: Takahiro Nakayama, Nagoya (JP); Kazuhiro Mima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 348 days.

(21) Appl. No.: 16/382,266

(22) Filed: Apr. 12, 2019

(65) Prior Publication Data

US 2019/0358815 A1 Nov. 28, 2019

(30) Foreign Application Priority Data

May 25, 2018 (JP) .............................. JP2018-100596

(51) Int. Cl.
*B25J 9/16* (2006.01)
*B25J 19/02* (2006.01)
*B25J 13/08* (2006.01)

(52) U.S. Cl.
CPC ........... *B25J 9/1674* (2013.01); *B25J 9/1612* (2013.01); *B25J 9/1679* (2013.01); *B25J 13/086* (2013.01); *B25J 19/02* (2013.01); *B25J 19/021* (2013.01)

(58) Field of Classification Search
CPC ........ B25J 19/021; B25J 13/086; B25J 19/02; B25J 19/022; B25J 9/1694; B25J 13/089; B25J 9/1676; B25J 9/1679; B25J 19/06; B25J 9/1674; G01V 8/20; G01V 8/22; G01C 3/00; G01S 17/10; G01S 17/48
See application file for complete search history.

(56) References Cited

U.S. PATENT DOCUMENTS

| | | |
|---|---|---|
| 2004/0140787 A1 | 7/2004 | Okamoto et al. |
| 2008/0231221 A1 | 9/2008 | Ogawa |
| 2014/0277723 A1 | 9/2014 | Nishimura et al. |
| 2017/0168475 A1* | 6/2017 | Choi ..................... B62D 65/024 |
| 2017/0360520 A1* | 12/2017 | Hares ...................... A61B 34/74 |
| 2018/0236667 A1* | 8/2018 | Gombert ................ B25J 13/086 |
| 2019/0143522 A1* | 5/2019 | Miyazawa ............... B25J 19/06 |
| | | 700/258 |
| 2019/0146504 A1* | 5/2019 | Lee ............................ B25J 9/00 |
| | | 700/259 |
| 2019/0193267 A1* | 6/2019 | Peng ...................... B25J 9/1676 |
| 2019/0250304 A1 | 8/2019 | Yoon |
| 2020/0180162 A1* | 6/2020 | Roziere .................. B25J 19/021 |

FOREIGN PATENT DOCUMENTS

| | | |
|---|---|---|
| DE | 10 2010 046327 A1 | 3/2012 |
| JP | 362-85394 U | 5/1987 |
| JP | S63-4295 U | 1/1988 |

(Continued)

*Primary Examiner* — Khoi H Tran
*Assistant Examiner* — Tanner L Cullen
(74) *Attorney, Agent, or Firm* — Oliff PLC (57) ABSTRACT

Provided is a manipulator including: a link; a joint unit configured to rotate the link; and a distance sensor configured to detect an obstacle entering in a monitoring space that is determined so as to include at least a rotating direction side of the link, the distance sensor being installed so that a sensing direction faces a direction parallel to a surface of the link. Further, provided is a moving robot including the aforementioned manipulator.

6 Claims, 8 Drawing Sheets

102

(56) References Cited

FOREIGN PATENT DOCUMENTS

| JP | S63-27298 U | 2/1988 | |
|---|---|---|---|
| JP | H07-49711 A | 2/1995 | |
| JP | 2000162062 A * | 6/2000 | ............. B25J 19/02 |
| JP | 2005214716 A * | 8/2005 | ............. G01B 11/00 |
| JP | 2005221333 A * | 8/2005 | ............. B25J 19/02 |
| JP | 2006-021287 A | 1/2006 | |
| JP | 2006-043792 A | 2/2006 | |
| JP | 4550849 B2 | 9/2010 | |
| JP | 4683073 B2 | 5/2011 | |
| JP | 2011194488 A * | 10/2011 | ............. B25J 19/06 |
| JP | 5668770 B2 | 2/2015 | |
| JP | 6036647 B2 | 11/2016 | |
| JP | 2017-138154 A | 8/2017 | |
| JP | 2017-150902 A | 8/2017 | |
| JP | 2017-207303 A | 11/2017 | |
| WO | 2018/079769 A1 | 5/2018 | |

* cited by examiner

MANIPULATOR AND MOVING ROBOT

CROSS REFERENCE TO RELATED APPLICATIONS

This application is based upon and claims the benefit of priority from Japanese patent application No. 2018-100596, filed on May 25, 2018, the disclosure of which is incorporated herein in its entirety by reference.

BACKGROUND

The present disclosure relates to a manipulator and a moving robot.

A technique for detecting a person and an obstacle that approach an operation space of a manipulator that operates, such as a robot arm and a robot hand, is known (For example, see Japanese Unexamined Patent Application Publication No. H7-49711).

SUMMARY

Although the related art is excellent for detecting an obstacle approaching an entire operation space of a manipulator, it is not suitable for the purpose of individually monitoring a local operation space of each link. It is possible to analyze images which can be obtained by a camera in order to detect an obstacle including the local operation space. However, there are problems that a load of analysis processing increases or an operation space that becomes a blind spot is generated.

The present disclosure provides a manipulator capable of accurately monitoring an obstacle entering in an operation space of each link with a simpler sensor configuration and a moving robot including the manipulator.

A first exemplary aspect is a manipulator, including: a link; a joint unit configured to rotate the link; and a distance sensor configured to detect an obstacle entering in a monitoring space that is determined so as to include at least a rotating direction side of the link, the distance sensor being installed so that a sensing direction faces a direction parallel to a surface of the link. With such a configuration, it is possible to accurately monitor an obstacle entering in a local monitoring space set in a rotating direction of the link. Further, since the distance sensor can be used with relative ease, even when the distance sensor is installed for each of the links, a processing load is minor and an installation cost can be reduced.

In the above-described manipulator, the distance sensor is preferably installed so that the sensing direction corresponds to a longitudinal direction of the link. When it is installed in such a manner, a large monitoring space can be monitored with a fewer number of distance sensors. Further, the distance sensor is preferably installed at an end of the link. If it is installed at the end of the link, a space that becomes a blind spot for the distance sensor can be reduced.

Further, in the above-described manipulator, the distance sensor preferably includes: a light emitting unit configured to emit a modulated projection light; and a light receiving unit configured to receive the projection light reflected by the obstacle. The distance sensor having such a configuration can calculate a distance measurement result with a relatively simple circuit configuration, and thus it is suitable when a large number of distance sensors are installed. Further, it is preferred that the one distance sensor be installed for each of the rotating links and the respective projection lights of the distance sensors be modulated so as to differ from each other. When the one distance sensor is installed for each of the links, there is a possibility of a projection light from a distance sensor installed in one link reaching the light receiving unit of a distance sensor installed in another link. Such a case causes an error detection. However, if the respective projection lights of the distance sensors are modulated so as to differ from each other, it is possible to prevent such an error detection by checking a correlation between the projection light and the reflected light.

Further, the distance sensor is preferably a sensor of the triangular distance measurement system. The sensor of the triangular distance measurement system may detect a position of the reflected light, and thus a sensor configuration can be simple. Further, the projection light of the distance sensor is preferably an infrared light. If an infrared radiation is used as the projection light, it does not bother workers working in the surrounding area.

Further, a plurality of distance sensors may be used to detect an obstacle entering in one monitoring space. By installing the plurality of distance sensors in parallel, a size of the monitoring space can be expanded in accordance with the specification. When the plurality of distance sensors are installed for one monitoring space, it is preferred that the respective projection lights of the distance sensors be modulated so as to differ from each other. When the respective projection lights of the distance sensors are modulated so as to differ from each other, it is possible to prevent such error detection by checking a correlation between the projection light and the reflected light.

Another exemplary aspect is a moving robot including the aforementioned manipulator. Since a sensor configuration for monitoring a local monitoring space set in each link does not affect a space recognition in a movement operation of the moving robot, this configuration is convenient when the operations of the manipulator and the moving robot are performed simultaneously.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
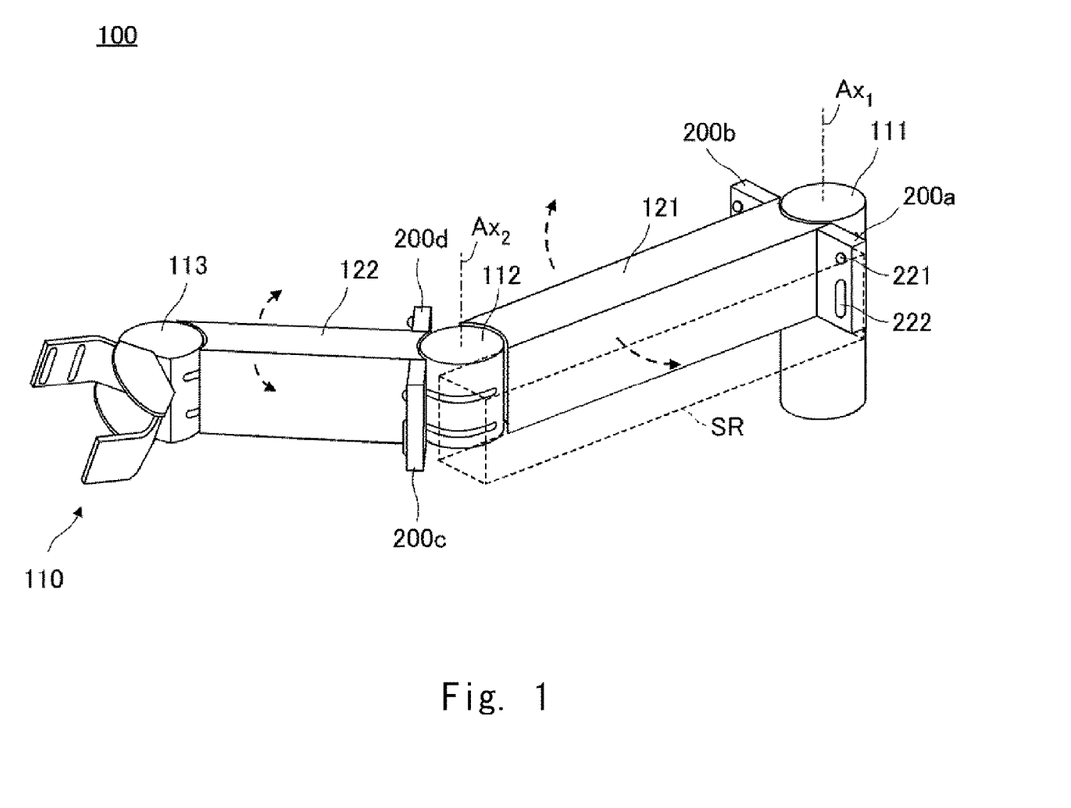
FIG. 1 is an external perspective view of a manipulator according to an embodiment.

FIG. 1 is an external perspective view of a manipulator 100 according to this embodiment. The manipulator 100 mainly includes joint units (a first joint unit 111, a second joint unit 112, and a third joint unit 113), links (a first link 121 and a second link 122), a hand 110, and distance sensors (an $L_1$ distance sensor 200a, a $R_1$ distance sensor 200b, an $L_2$ distance sensor 200c, and a $R_2$ distance sensor 200d).

The first joint unit 111 supported by a base (not shown) incorporates a motor for rotating the first link 121 around a rotating shaft $Ax_1$ and also supports the first link 121 in a rotatable manner. The first link 121 has a box shape extending from the first joint 111 in a radiation direction with respect to the rotating shaft $Ax_1$ as a longitudinal direction thereof, and supports the second joint 112 at a tip thereof.

The second joint unit 112 incorporates a motor for rotating the second link 122 around a rotating shaft $Ax_2$ and also supports the second link 122 in a rotatable manner. The second link 122 has a box shape extending from the second joint 112 in a radiation direction with respect to the rotating shaft $Ax_2$ as a longitudinal direction thereof, and supports the third joint 113 at the tip thereof. The third joint 113 incorporates a motor for achieving a grasping motion in which the hand 110 grasps a target object, and also supports the hand 110 in a rotatable manner.

Monitoring spaces SR for monitoring an entry of an obstacle are respectively set on the rotating direction sides of the first and second links 121 and 122. For example, the monitoring space SR set on the counterclockwise rotating direction side of the first link 121 is indicated by a substantially rectangular parallelepiped space surrounded by a dotted line as shown in FIG. 1. The $L_1$ distance sensor 200a monitors this monitoring space SR surrounded by a dotted line and detects an obstacle entering therein. A sensing region in which the $L_1$ distance sensor 200a can detect the obstacle includes the monitoring space SR. The $L_1$ distance sensor 200a is installed in the vicinity of a base end part of the first link 121 and on the counterclockwise rotating direction side.

The $L_1$ distance sensor 200a is a sensor of the triangular distance measurement system that detects a distance to an obstacle by collecting, with a condenser lens, the reflected light in which the projection light projected toward the monitoring space SR through a projection lens 221 is reflected by the obstacle and returned. The $L_1$ distance sensor 200a is installed so that the projection direction of the projection light faces a direction parallel to a surface of the first link 121. That is, the $L_1$ distance sensor 200a is installed so that the sensing direction corresponds to the longitudinal direction of the first link 121. Note that in this embodiment, although the first link 121 has a box shape, it is not necessary for the link surface to be a plane. It can be considered that since the projection direction of the projection light is a direction parallel to the link surface, the projection direction of the projection light is a direction orthogonal to a moving direction of the link.

The $R_1$ distance sensor 200b, the $L_2$ distance sensor 200c, and the $R_2$ distance sensor 200d are the same distance sensors of the triangular distance measurement system as the $L_1$ distance sensor 200a. The $R_1$ distance sensor 200b is installed in the vicinity of the base end part of the first link 121 on the clockwise rotating direction side thereof. Similarly, the $L_2$ distance sensor 200c is installed in the vicinity of a base end part of the second link 122 on the counterclockwise rotating direction side thereof, and the $R_2$ distance sensor 200d is installed in the vicinity of the base end part of the second link 122 on the clockwise rotating direction side thereof. The distance sensors are respectively installed so that the projection direction of the projection light faces a direction parallel to each surface of the links, and monitor the monitoring space SR set on the rotating direction side and detects an obstacle entering therein.

The distance sensors respectively transmit a detection result to a control unit (not shown) when detecting an obstacle entering in the monitoring space. The control unit stops a rotating operation or maintains a grasping state in accordance with the detection result. With such a configuration, it is possible to accurately monitor an obstacle entering in the local monitoring space SR set in a rotating direction of each of the links. Further, since the distance sensors are respectively installed so that the sensing direction corresponds to the longitudinal direction of each of the links, it is possible to monitor a relatively large monitoring space with a small number of distance sensors. Further, since the distance sensor is installed in an end of the link, there is less space that becomes a blind spot where an obstacle entering in a monitoring space cannot be detected.

Figure 2:
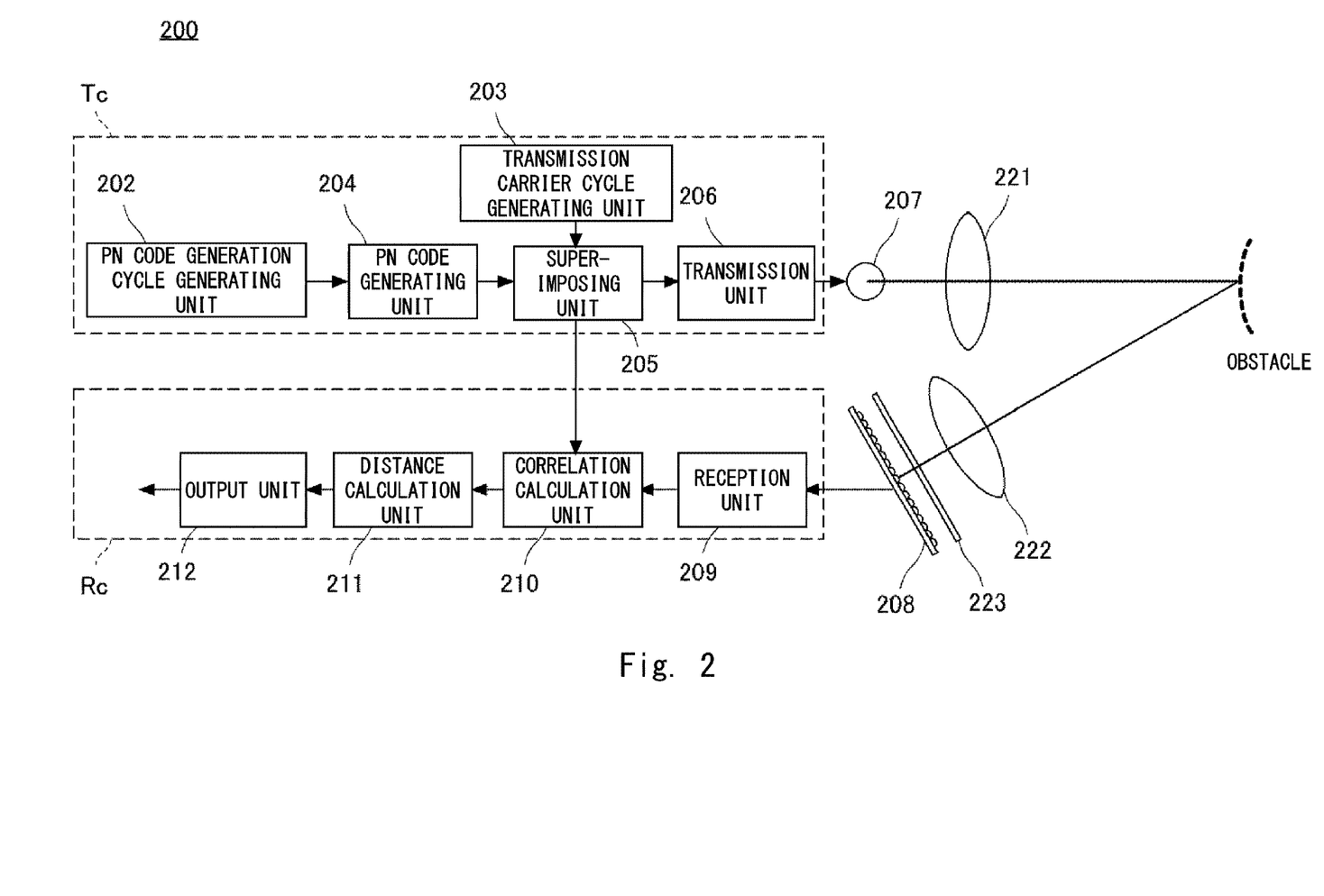
FIG. 2 is a block diagram showing a configuration of a distance sensor.

Next, a distance sensor 200 is described in detail. FIG. 2 is a block diagram showing a configuration of the distance sensor 200. The distance sensor 200 includes a transmission side circuit Tc that generates a projection light for measuring a distance, and a receiving side circuit Rc that performs various processes by receiving a reflected light in which the projection light is reflected by an obstacle and returned. The distance sensor 200 measures a distance to the obstacle by the projection light using an IR light in the triangular distance measurement system. The projection light is projected from a light-emitting device 207 which is, for example, an infrared LED outputting the IR light. The projection light projected from the light-emitting device 207 is converted into a substantially parallel light by the projection lens 221, which is emitted to the monitoring space SR.

A PN code generation cycle generating unit 202 generates a cycle signal to generate a PN code and transfers the generated cycle signal to a PN code generating unit 204. The PN code generating unit 204 generates a PN code by using the cycle signal received from the PN code generation cycle generating unit 202 as a trigger and transfers the generated PN code to a superimposing unit 205. The PN code includes a pseudo noise (PN) signal.

Figure 3:
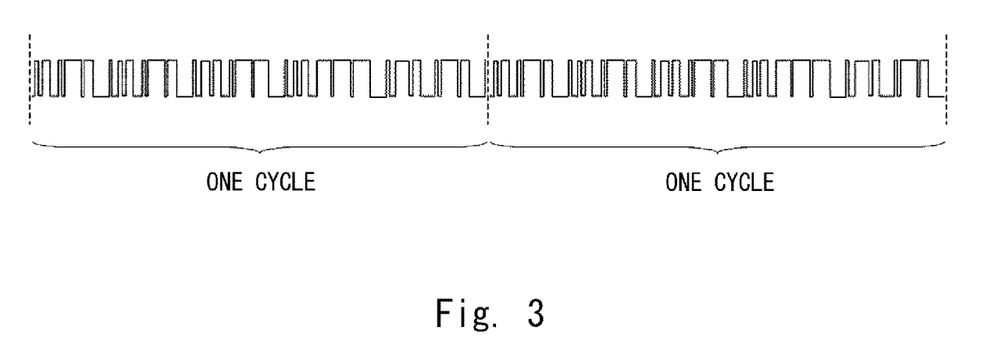
FIG. 3 is a diagram showing an example of generating a PN code.

An M sequence having a binary code with an autocorrelation characteristic is used for the generation of the PN code. The PN code generating unit 204 includes a logic circuit which is composed of an n-bit shift register and one or more half-adders, for generating the M sequence. The M sequence is a code string having a cycle (bit length) of 2 n-1. In this embodiment, the 127-bit M sequence of n=7 as shown in FIG. 3, for example.

With reference again to FIG. 2, the explanation is continued. A transmission carrier cycle generating unit 203 generates a carrier frequency having a constant frequency and transfers the generated carrier frequency to the superimposing unit 205. The superimposing unit 205 superimposes the PN code received from the PN code generating unit 204 on the carrier frequency received from the transmission carrier cycle generating unit 203 to generate a light-emitting pattern, and then transfers the generated light-emitting pattern to a transmission unit 206. The transmission unit 206 blinks the light-emitting device 7 in accordance with the light-emitting pattern received from the superimposing unit 205 to make the light-emitting device 7 project a projection light.

When there is no obstacle in the monitoring space SR, a reflected light is not returned. Even when a reflected light is returned from outside the monitoring space SR, a light-receiving device 208 does not receive the reflected light.

Alternatively, even when it receives the reflected light, error processing is performed by a circuit at the subsequent stage.

When there is an obstacle in the monitoring space SR, the projection light reflected by the obstacle is collected by a condenser lens 222. The collected projection light passes through an IR filter 223 which makes an infrared light selectively pass therethrough, and then reaches the light-receiving device 208. The light-receiving device 208 is, for example, a PSD (Position Sensitive Detector) device, and a photodiode corresponding to a distance to the obstacle detects the reflected light. An output from the light-receiving device 208 is transmitted to a reception unit 209 as a light-receiving pattern including light-receiving position information. The reception unit 209 converts the received light-receiving pattern into a reception signal and transfers the reception signal to a correlation calculation unit 210.

Figure 4:
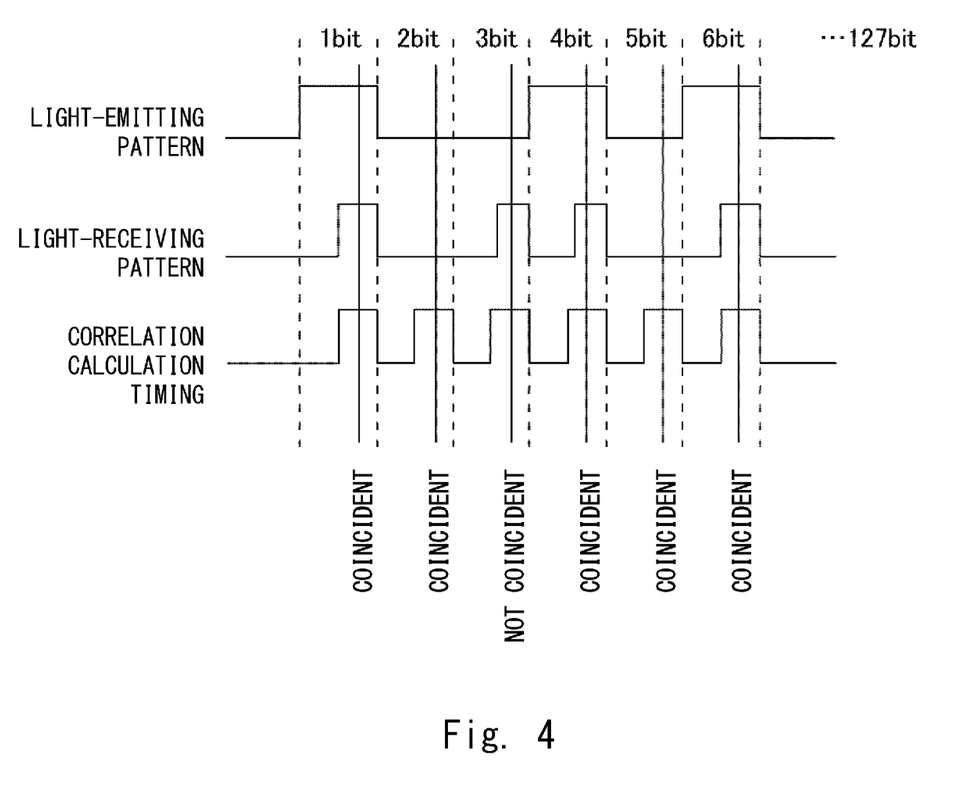
FIG. 4 is a diagram showing timings at which a correlation calculation is performed.

The correlation calculation unit 210 calculates a correlation between the light-receiving pattern of the reception signal received from the reception unit 209 and the light-emitting pattern generated by the superimposing unit 205. Specifically, the correlation calculation unit 210 calculates a coincidence degree indicating a degree of coincidence between the light-emitting pattern and the light-receiving pattern. FIG. 4 is a diagram showing timings at which a correlation calculation is performed.

The coincidence degree is calculated by comparing the blinking pattern of the light-emitting pattern with the light-receiving pattern for each bit of the predetermined correlation calculation timings. For example, when a 7-bit shift register is used, blinks in which the light-emitting pattern and the light-receiving pattern coincide are counted for each of the 127 correlation operation timings. In the case of the blink in which the light-emitting pattern and the light-receiving pattern coincide, a counter C is incremented, and in the case of the blink in which the light-emitting pattern and the light-receiving pattern do not coincide, the counter C remains unchanged.

When the light-emitting patterns and the light-receiving patterns all coincide, the counter C indicates 127. The coincidence degree is a value obtained by dividing the counter C by 127, and when this value is equal to or larger than a predetermined threshold value, the correlation calculation unit 210 determines that the reflected light is a reflected light in which the projection light projected from the light-emitting device 207 is returned. On the other hand, when the coincidence degree is smaller than the predetermined threshold value, the correlation calculation unit 210 determines that the reflected light is an incident light which does not result from the projection light projected from the light-emitting device 207.

With reference again to FIG. 2, the explanation is continued. A distance calculation unit 211 calculates a distance when the coincidence degree is equal to or larger than the predetermined threshold value. The distance calculation unit 211 uses the light-receiving position information of the light-receiving device 208 to calculate a distance to an obstacle based on the principle of the triangular distance measurement, and transfers the calculated distance to an output unit 212. Note that when the light-receiving device 208 does not receive a reflected light, or when the incident light in which the coincidence degree is less than the predetermined threshold value is received, the distance calculation unit 211 transfers a signal indicating that there is no obstacle to the output unit 212. The output unit 212 outputs a detection result showing that there is no distance calculated by the distance calculation unit 211 or there is no obstacle to the control unit (not shown). The control unit controls the manipulator 100 in accordance with this detection result.

The manipulator 100 includes four such distance sensors 200 (the $L_1$ distance sensor 200a, the $R_1$ distance sensor 200b, the $L_2$ distance sensor 200c, and the $R_2$ distance sensor 200d) as described above. The respective distance sensors use a PN code different from each other, and thus the light-emitting pattern thereof differs from each other. That is, the respective projection lights of the distance sensors are modulated so as to differ from each other. Accordingly, even when a light reflected by a projection light from a distance sensor accidentally reaches the light-receiving unit of another distance sensor, the coincidence degree calculated by the correlation calculation unit 210 becomes small, and thus it is not erroneously determined that there is an obstacle. Further, the distance sensor 200 uses the infrared light, which is invisible, and thus it does not bother workers working in the surrounding area.

Figure 5:
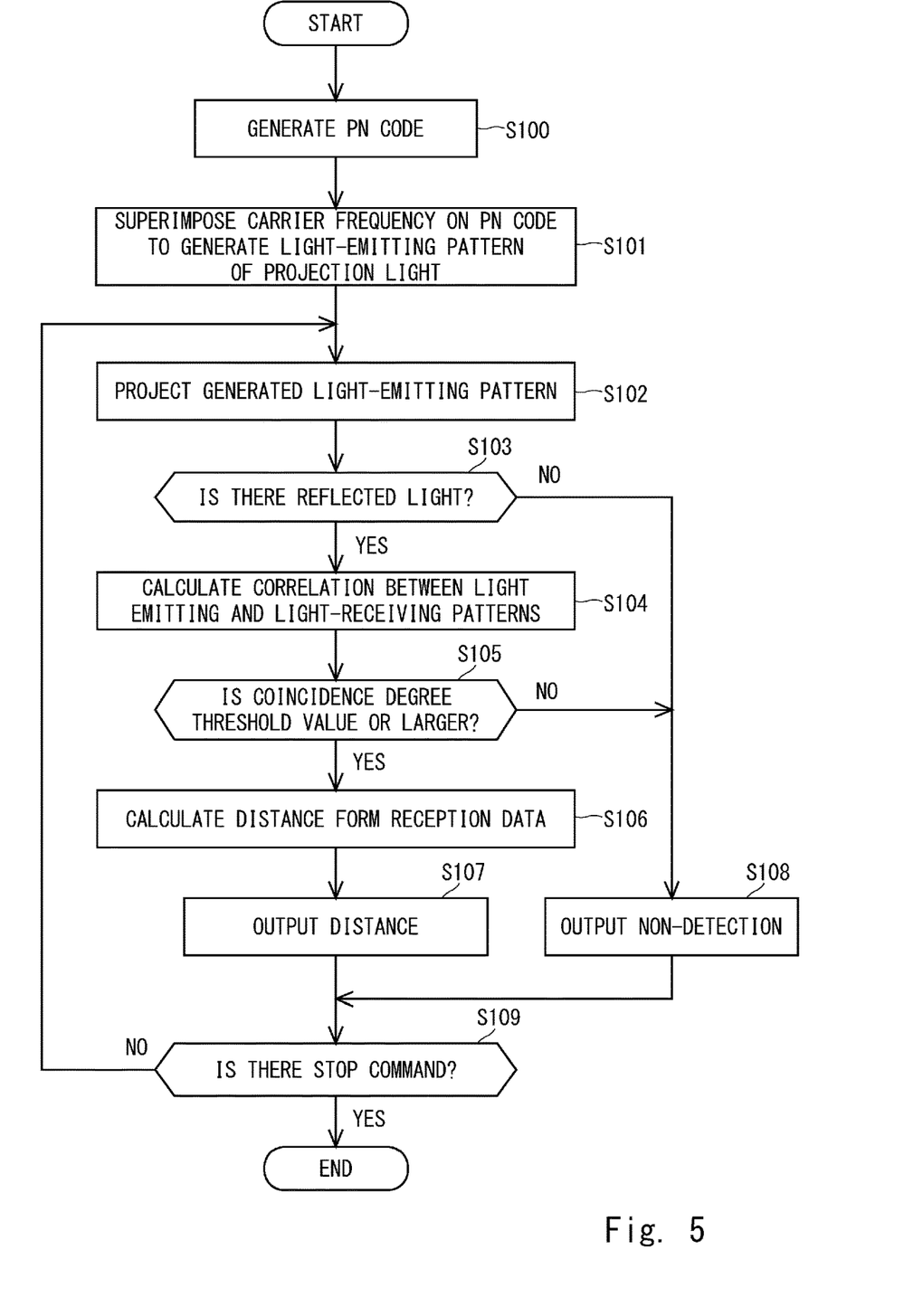
FIG. 5 is a flowchart showing processes of a distance measurement.

Next, a process procedure for a distance measurement is described using a flowchart. FIG. 5 is the flowchart showing processes of the distance measurement.

In Step S100, The PN code generating unit 204 generates a PN code based on the PN code cycle generated by the PN code generation cycle generating unit 202. In Step S101, the superimposing unit 205 superimposes the PN code and the carrier frequency generated by the transmission carrier cycle generating unit 203 to generate a light-emitting pattern. In Step S102, the transmission unit 206 blinks the light-emitting device 207 according to the light-emitting pattern to make it project a projection light.

In Step S103, when having received the light-receiving pattern from the light-receiving device 208, the reception unit 209 converts the received light-receiving pattern into a reception signal and transfer the reception signal to the correlation calculation unit 210. When the reception signal has been transferred, the process proceeds to Step S104. When the light-receiving pattern has not yet been received from the light-receiving device 208, the process proceeds to Step S108.

In Step S104, the correlation calculation unit 210 calculates a coincidence degree from the light-receiving pattern of the reception signal and the light-emitting pattern generated by the superimposing unit 205. Then, the process proceeds to Step S105, and it is determined whether the coincidence degree is equal to or larger than a predetermined threshold value. When the coincidence degree is equal to or larger than the predetermined threshold value, the process proceeds to Step S106, and when the coincidence degree is less than the predetermined threshold value, the process proceeds to Step S108.

In Step S107, the distance calculation unit 211 uses the light-receiving position information of the light-receiving device 208 to calculate a distance to an obstacle based on the principle of the triangular distance measurement, and transfers the calculated distance to the output unit 212. Then, the output unit 212 outputs the distance calculated by the distance calculation unit 211 as a detection result to the control unit. Then, the process proceeds to Step S109.

When the process has proceeded to Step S108 from Step S103 or the step S105, the distance calculation unit 211 outputs a detection result showing that there is no obstacle in the monitoring space SR to the control unit. Then, the process proceeds to Step S109. In Step S109, when a stop command is received, each block of the distance sensors 200 stops the function thereof and ends the series of processes. When the stop command is not received, the process returns to Step S102 and the series of processes is repeated. Note that the processes in Step S102 to Step S108 are repeated, for example, at a cycle of 10 msec.

Figure 6:
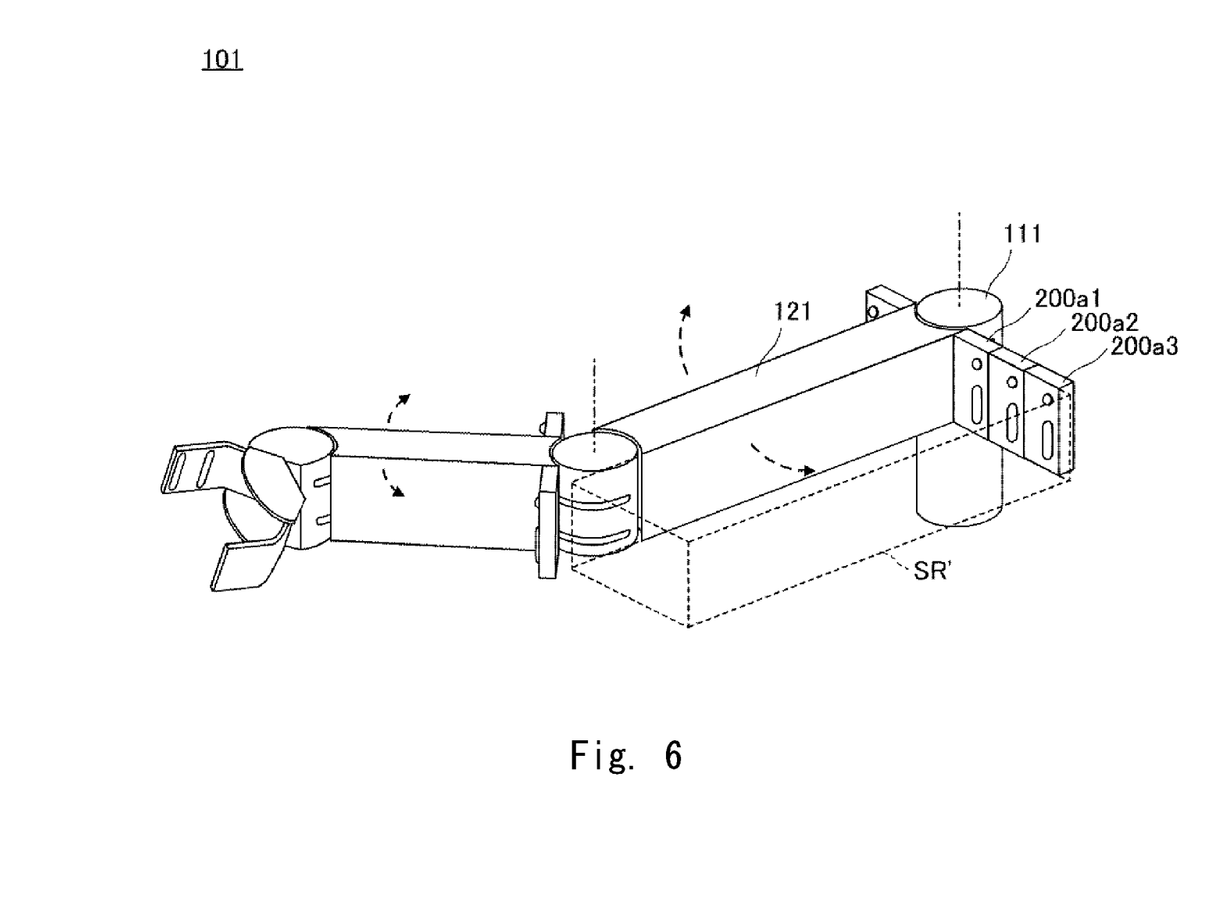
FIG. 6 is an external perspective view of a manipulator according to a modified example.

FIG. 6 is an external perspective view of a manipulator 101 which is a modified example of the manipulator 100. The manipulator 101 is the same as the manipulator 100 other than a configuration corresponding to the $L_1$ distance sensor 200a of the manipulator 100. Accordingly, the explanation of the same configuration is omitted.

The manipulator 101 sets a monitoring space SR' to be set on the counterclockwise rotating direction side of the first link 121 wider than the above-described monitoring space SR. In the case where the monitoring space is set wider as described above, a plurality of distance sensors are installed. For example, as shown in FIG. 6, by attaching three distance sensors 200a1, 200a2, and 200a3 alongside each other, it is possible to widen the monitoring space in the rotating direction.

That is, a size of the monitoring space can be determined according to, for example, a rotating speed of the link 121 and a moving speed of an assumed obstacle, and the number of distance sensors to be installed and an installation location can be adjusted in accordance with the determined size. In this case, the plurality of distance sensors for monitoring the same monitoring space preferably uses a PN code different from each other. That is, the respective projection lights of the distance sensors are modulated so as to differ from each other. When the respective projection lights of the distance sensors are modulated so as to differ from each other, even when a plurality of projection lights are projected in the same monitoring room, there is no possibility that an obstacle will be detected erroneously.

Figure 7:
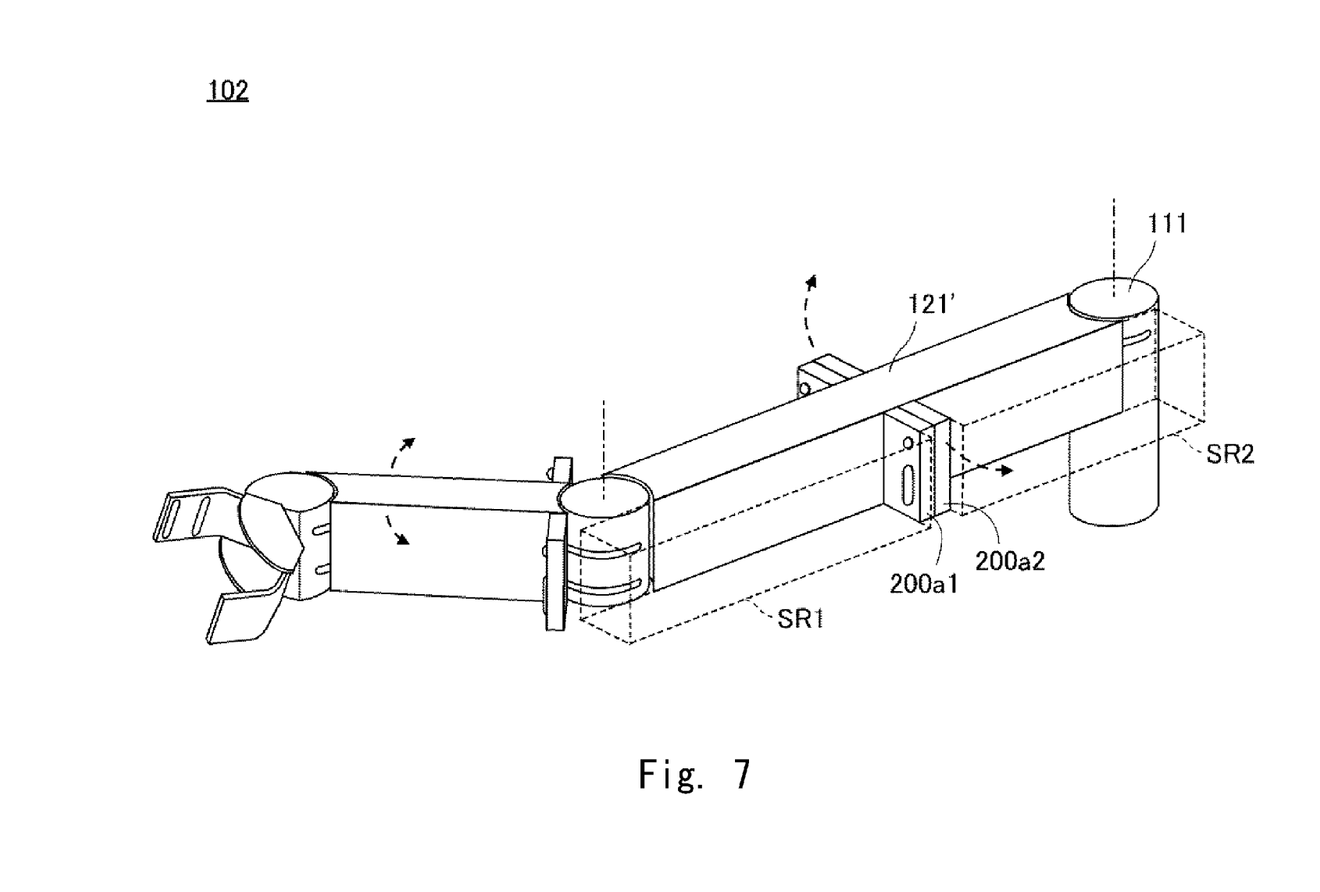
FIG. 7 is an external perspective view of a manipulator according to a modified example.

FIG. 7 is an external perspective view of a manipulator 102 which is a modified example of the manipulator 100. The manipulator 102 differs from the manipulator 100 in that the first link 121' is longer than the first link 121 of the manipulator 100 and the monitoring space for the first link 121' is therefore widened. The explanation of the same configuration as that of the manipulator 100 is omitted.

Since the first link 121' is long in the longitudinal direction as shown in FIG. 7, the monitoring space to be set on the clockwise rotating direction side thereof and the monitoring space to be set on the counterclockwise rotating direction thereof are set by respectively dividing them into two parts in the longitudinal direction. For example, as shown in FIG. 7, two monitoring spaces SR1 and SR2 are set as the monitoring space to be set in the counterclockwise rotating direction. Further, the distance sensors 200a1 and 200a2 which respectively monitor the monitoring spaces SR1 and SR2 are installed so as to be back to back in the vicinity of the center of the side surface of the first link 121'. If the distance sensors 200a1 and 200a2 are installed in such a manner, there is no possibility that the projection lights projected by the respective distance sensors will intersect. Obviously, even when the distance sensors 200a1 and 200a2 are installed in such a manner, the respective projection lights of the distance sensors may be modulated so as to differ from each other.

Figure 8:
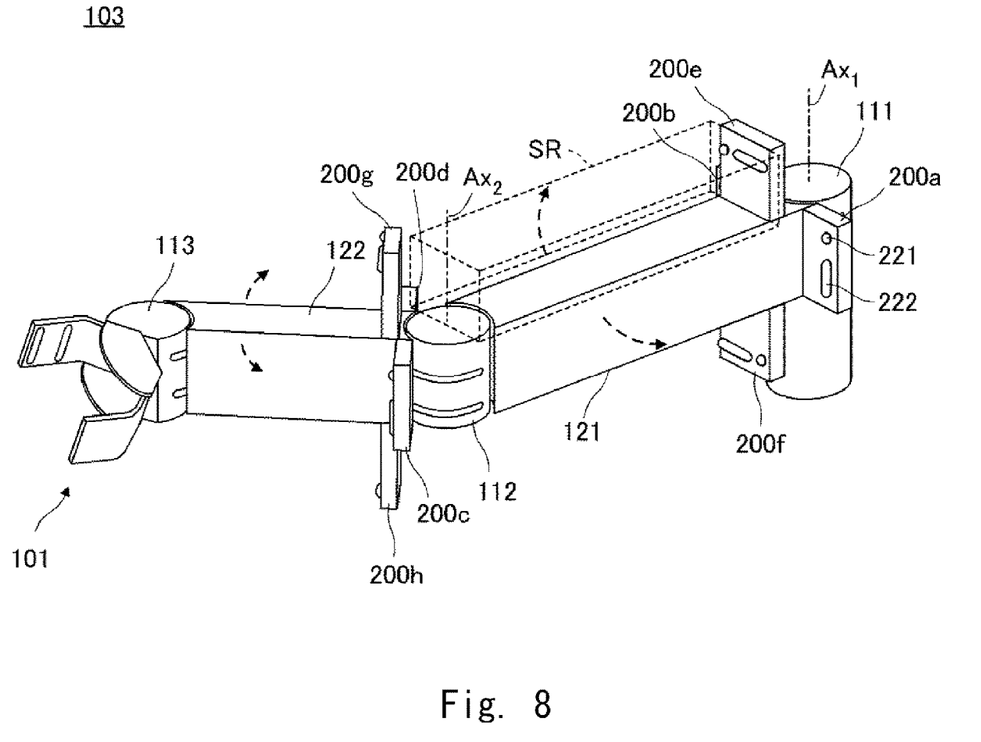
FIG. 8 is an external perspective view of a manipulator according to a modified example.

FIG. 8 is an external perspective view of a manipulator 103 which is a modified example of the manipulator 100. As shown in FIG. 8, in addition to the configuration of the manipulator 100, the manipulator 103 also includes distance sensors 200e and 200f on the upper and lower side surfaces of the first link 121, and distance sensors 200g and 200h on the upper and lower side surfaces of the second link 122. The explanation of the same configuration as that of the manipulator 100 is omitted.

For example, the distance sensor 200e provided on the upper side surface of the first link 121 monitors the monitoring space SR surrounded by a dotted line. As described above, in each of the links, if the space adjacent to the upper and lower side surfaces which is not in the rotating direction is also monitored, it is possible to form the monitoring space such that all the links are covered as a whole. A monitoring space formed in such a way not only detects an obstacle which collides with the link due to an operation of the link, but also can detect an obstacle which collides with the link due to its own approach to the monitoring space. Therefore, it is possible to perform a link control more safely.

As described above, although the embodiments of each of the manipulators have been described, a distance sensor to be installed may not be a distance sensor using an infrared light of the triangular distance measurement system. Any distance sensor, which is capable of detecting an obstacle entering in a local monitoring space that is determined so as to include at least a rotating direction side of a link and is capable of being installed so that a sensing direction faces a direction parallel to a surface of the link in order to less affect other control system, can be adopted. For example, a TOF distance sensor may be used, and an ultrasound sensor can be used. In many cases, since a distance sensor can be used with relative ease and at low cost, even when a distance sensor is installed for each of links, a processing load is minor and an installation cost can be also reduced.

Further, in the above-described embodiments, although the examples in which a distance sensor is installed on an arm part have been described, the same distance sensor as that of the examples is installed on a link part constituting a hand, thus having the same advantageous effects for a movement of the hand as those for the movement of the arm. When the same distance sensor as that of the examples is applied to the hand, it can be used not only for a function of detecting an obstacle but also for grasping an object to be grasped.

Further, the respective manipulators described above are suitable for mounting on a moving robot. Since the sensor configuration for monitoring a local monitoring space set for each of links does not affect a space recognition in a movement operation of the moving robot, this configuration is convenient when the operations of the manipulator and the moving robot are performed simultaneously.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A manipulator, comprising:
   a link;
   a joint unit configured to rotate the link; and
   a plurality of distance sensors configured to detect an obstacle entering into a plurality of monitoring spaces, the monitoring spaces including at least an area at a rotating direction side of the link, the distance sensors being arranged so that a sensing direction of each distance sensor is parallel to a longitudinal direction along a surface of the link, wherein
   the plurality of distance sensors are arranged in a back-to-back arrangement in a vicinity of a center, relative to the longitudinal direction, of the surface of the link,
   the plurality of distance sensors are configured to respectively monitor the plurality of monitoring spaces, the plurality of distance sensors include a first distance sensor and a second distance sensor, the first distance sensor and the second distance sensor are arranged in the back-to-back arrangement in the vicinity of the center of the surface of the link, and the sensing direction of the first distance sensor is opposite to the sensing direction of the second distance sensor.

2. The manipulator according to claim 1, wherein each of the plurality of distance sensors comprises:

a light emitting unit configured to emit a modulated projection light; and a light receiving unit configured to receive the projection light reflected by the obstacle.

3. The manipulator according to claim 2, wherein the link includes a plurality of links, the joint unit includes a plurality of joint units configured to rotate the plurality of links respectively, the plurality of distance sensors are arranged for each of the plurality of links respectively, and the respective projection lights of the distance sensors are modulated so as to differ from each other.

4. The manipulator according to claim 2, wherein each distance sensor is a sensor of a triangular distance measurement system.

5. The manipulator according to claim 2, wherein the projection light of each distance sensor is an infrared light.

6. A moving robot comprising the manipulator according to claim 1.

* * * * *